United States Patent [19]

Gants et al.

[11] Patent Number: 4,559,005
[45] Date of Patent: Dec. 17, 1985

[54] MACHINE FOR FORMING COMPOSITE MATERIAL INTO FILLETS

[75] Inventors: Wilbur L. Gants, Renton; William T. Kline, Seattle; Jonathan T. Sneddon, Bellevue, all of Wash.

[73] Assignee: The Boeing Company, Seattle, Wash.

[21] Appl. No.: 685,531

[22] Filed: Dec. 24, 1984

[51] Int. Cl.⁴ .............................................. B27C 17/02
[52] U.S. Cl. .................................... 425/363; 425/367
[58] Field of Search ............... 425/335, 336, 363, 367, 425/381

[56] References Cited

U.S. PATENT DOCUMENTS

| Re. 29,332 | 8/1977 | Bilbro | 165/164 |
|---|---|---|---|
| 2,867,001 | 1/1959 | Lewis et al. | 18/6 |
| 2,875,501 | 3/1959 | Gravley | 25/156 |
| 2,938,566 | 5/1960 | Toulmin, Jr. | 154/1.8 |
| 2,964,789 | 12/1960 | Conder et al. | 18/21 |
| 2,976,580 | 3/1961 | Riedel | 19/150 |
| 3,121,131 | 2/1964 | Blume, Jr. | 264/104 |
| 3,470,286 | 9/1969 | Weber | 264/167 |
| 3,993,726 | 11/1976 | Moyer | 264/174 |
| 3,994,215 | 11/1976 | Rabeler | 425/367 X |
| 4,017,579 | 4/1977 | Roe | 264/174 |
| 4,153,664 | 5/1979 | Sabee | 264/289 |
| 4,161,503 | 7/1979 | Foulkes et al. | 264/136 |
| 4,256,790 | 3/1981 | Lackman et al. | 428/73 |

OTHER PUBLICATIONS

Portions of a Brochure Illustrating Morse Power Transmission Products.
Brochure from Associated Spring Illustrating Stock Springs & Spring Washers.

Primary Examiner—J. Howard Flint, Jr.
Attorney, Agent, or Firm—Christensen, O'Connor, Johnson & Kindness

[57] ABSTRACT

Disclosed is a machine for forming preimpregnated composite material into thin, narrow structural elements or "fillets" (18). The machine includes a cylindrical lower forming roll (26) rotatably mounted at its ends between two side plates (40). A cylindrical upper forming roll (28) is mounted above the lower forming roll and urged into frictional contact therewith. Annular protrusions (30) are formed in the periphery of the lower forming roll and project radially therefrom. Each protrusion comprises a groove (34) formed in its outermost surface that defines a die. The die, with the outer surface of the upper forming roll, combine to form an orifice (35). Each orifice is shaped substantially identical to the cross-sectional shape of the fillet. A strip of composite material (24) is fed through a series of guides and into a selected orifice. A drive mechanism (36) causes rotation of the lower forming roll and hence the frictionally contacting upper forming roll. The resulting rotation causes the strip of composite material to be drawn from its supply source through the guides and to be compacted, while in the orifice, into a fillet.

15 Claims, 8 Drawing Figures

MACHINE FOR FORMING COMPOSITE MATERIAL INTO FILLETS

TECHNICAL AREA

This invention pertains to the fabrication of composite structures, particularly to a machine for forming preimpregnated composite material into thin, narrow structural elements or "fillets."

BACKGROUND OF THE INVENTION

Usage of structural elements formed of composite materials is currently very popular in the aerospace industry where the lightweight, highstrength characteristics of these elements are especially desirable. The composite materials that make up these structural elements typically consist of high-strength anisotropic fibers, such as graphite, embedded within a thermosetting resin matrix. One common type of composite material used in the fabrication of these structural elements is called "prepreg." Prepreg is a form of composite material wherein the resin is mixed with the fibers and partially cured before further molding or curing takes place. Prepreg composite material is available in the form of unidirectional fibers in thin strips called "tape." Prepreg tape is available in various widths and is typically stored on spools. In order to fabricate a structure, the prepreg tape is placed layer upon layer (or "laid up") in the configuration of the desired structure, and then cured into a rigid element.

When laying up prepreg tape it is important that the layers are evenly placed so that no voids are created in the resulting structure. Also, the strips of composite material must be handled in a way that avoids alteration of either the thermosetting characteristics of the resin or the anisotropic properties of the fibers. Voids in the material or damage to the fibers can seriously weaken the strength of the final structural element.

Laying up prepreg tape to form substantially planar or curved portions of composite structural elements usually presents few problems with respect to fiber damage or the creation of voids. However, some portions of structural elements have shapes that make them difficult to form without creating voids or otherwise diminishing the structural strength of the element. For example, in forming a composite structural element that has a T-shaped cross section (for instance, a flat panel having a perpendicularly extending flat stiffener), prepreg tape is laid up to form two L-shaped segments that are positioned back-to-back to create the T shape. The abutting legs of the L form the web of the T and the other legs of the L extend away from each other to form the flange of the T. A multiple-layered skin of prepreg tape is laid across the flanges of the T to complete the structure. Since it is important that the layers of prepreg tape that are used to form the web and flange of the T do not suffer loss of strength across the 90° bend in the L-shaped segments, the 90° bend is formed with a somewhat smooth curve to prevent damage to the composite material that would result if a sharp 90° fold were used. Forming the 90° bend with a smooth curve results in a cavity being formed at the junction of the web, flange and skin. The cross-sectional shape of this cavity is generally triangular; a flat base formed by the skin, and two concave sides formed by the facing surfaces of the bent portion of the L-shaped segments. If the panel is cured without filling the above-described cavity, the final structural element will be considerably weakened and/or deformed in the area of the cavity. Therefore, it is necessary to fill the cavity with a thin, narrow fillet. It is in forming the fillet that problems arise.

In the past, the cavity has been filled with a narrow piece of prepreg tape that was folded and hand-shaped into a fillet having a cross section similar to the cross section of the cavity. These hand-formed fillets were made by folding the prepreg tape into a size roughly equal to the cross-sectional size of the cavity. Sometimes the folded tape was pulled by hand through a die to further force the tape into a shape similar to that of the cavity.

Preparing a fillet by hand is very time consuming. It is also very difficult to ensure that no voids are present in the folded tape while at the same time maintaining the structural integrity of the fillet. Specifically, handforming of the fillet commonly results in twists or bunches that, after curing, result in voids in the structure. Additionally, hand shaping of the fillet can often result in damage to the fibers. Furthermore, pulling the composite prepreg material through a die generates frictional heat which transfers to the composite material and causes some premature curing of the resin, resulting in a somewhat stiff fillet that can be difficult to work with. Additionally, hand forming—with or without subsequent pulling of the material through a die—provides very little compaction of the fillet; the resulting cured fillet having voids and thus an unacceptably low density.

SUMMARY OF THE INVENTION

In accordance with this invention, a machine for drawing a strip of composite material from a supply source and forming it into a fillet is provided. The machine includes a frame that supports a pair of forming rolls whose peripheral surfaces engage one another in a manner that defines one or more orifices having a cross-sectional shape identical to that of the fillet. The forming rolls are rotated by a suitable drive mechanism. As the forming rolls rotate, prepreg tape, which has been threaded into one of the orifices, is drawn from its supply source and automatically compacted into the desired fillet shape.

In accordance with other aspects of this invention, the peripheral surface of one of the forming rolls includes a plurality of annular protrusions. Each protrusion has a groove formed in its outermost surface. The groove has a cross-sectional shape that forms a die defining two sides of a triangular-shaped fillet. The size of the grooves vary from one protrusion to another. The peripheral surface of the other forming roll is interrupted by outwardly projecting guard rims formed at spaced-apart locations along the outer surface of the upper forming roll. The forming rolls mesh such that each forming roll protrusion fits between an associated pair of guard rims. The die grooves of the first forming roll and the adjacent portion of the outer surface of the other forming roll that is between the associated pair of guard rims define an orifice that has a cross-sectional shape substantially identical to that of the fillet.

In accordance with further aspects of this invention, each annular protrusion has flat sidewalls that are in frictional contact with the guard rims associated with the protrusion. Thus, when one of the forming rolls is rotated by a suitable drive mechanism, the frictional contact between the guard rims and the protrusions causes corresponding rotation of the other roll.

Composite material directed into one of the orifices formed by the forming rolls is evenly compacted as it passes through the orifice and exits the machine as a fillet of the desired shape. The guard rims prevent the composite material from being laterally squeezed out of the orifice as the composite material passes through it.

In accordance with still further aspects of this invention, guides mounted on the machine direct the composite material from the supply source into the chosen orifice.

In accordance with yet other aspects of this invention, annularly projecting ridges are formed at each end of the peripheral surface of one of the forming rolls. In order to minimize wear on the dies, these ridges project outwardly by an amount adequate to prevent bearing contact between the dies and the surface of the forming roll lying between the guard rims.

Since each die groove has a cross section that is dissimilarly sized from the cross section of every other groove, numerous sized fillets can be formed with a single machine. Once the machine is set up, it is capable of continuously drawing prepreg tape from a supply source and automatically compacting the tape into the desired fillet shape. The guide and compaction action of the machine results in a fillet with no voids and one that is well compacted for final curing. Fillets produced by a machine formed in accordance with this invention can be of any desired length and created significantly faster than they could be by using the manual techniques heretofore practiced.

BRIEF DESCRIPTION OF THE DRAWINGS

The invention with its attendant advantages will become better understood from the following detailed description when considered in combination with the accompanying drawings, wherein.

DETAILED DESCRIPTION OF THE PREFERRED EMBODIMENT

Prior to describing the details of a preferred embodiment of a machine formed in accordance with this invention, the nature of the fillet to be produced by that machine is described to facilitate the understanding of the machine description. In this regard, attention is directed to FIG. 1, which illustrates a portion of a common structural element 10. The element shown is a composite panel 11 with an affixed stiffener 14 that extends perpendicularly from the plane of the panel. The cross section of this portion of the structural element is T-shaped; the panel 11 defining the flange of the T and the stiffener 14 defining the web.

Figure 1:
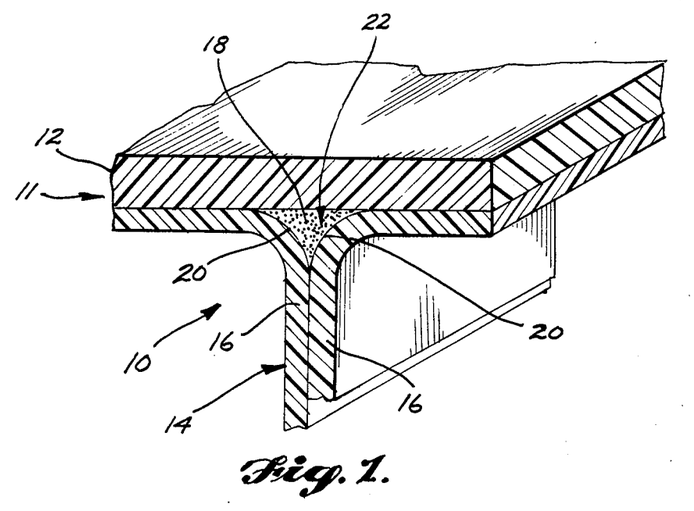
FIG. 1 is an isometric sectional view of a common structural element formed of composite material.

In order to fabricate the above-described structural element 10 from uncured composite material, four basic components are employed: a flat skin 12; two L-shaped segments 16; and a fillet 18. The L-shaped segments 16 are positioned in back-to-back relationship to form a T shape. The legs of the L-shaped segments 16 that abut one another, i.e., the web of the T, form the stiffener 14. The other legs of the L-shaped segments 16 are placed against the skin 12 and, with the skin, form the flange of the T. The 90° bend 20 in each L-shaped segment 16 follows a smooth curve. This shape is preferred to a sharp 90° fold since the latter would result in damage to the fibers and/or resin of the composite material.

As can be seen in FIG. 1, the smooth bend 20 in the L-shaped segments 16 results in a cavity 22 at the junction of the web and flange of the T, and the skin segment 12. The cross-sectional shape of the cavity 22 is substantially triangular, with the inner surface of the skin segment 12 defining one side of the triangle, and the facing inner surfaces of the bent portion 20 of the L-shaped segments forming the other two sides. Thus, the cavity's cross section has one flat side and two concave sides.

Figure 2:
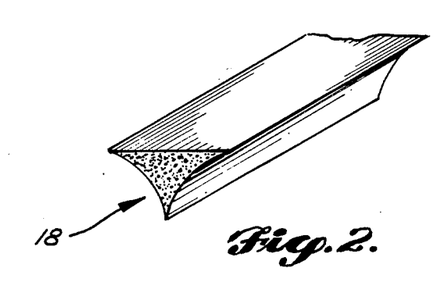
FIG. 2 is an isometric sectional view of a fillet portion of the structural element of FIG. 1.

A fillet 18 (FIG. 2) made of composite material and having a cross-sectional shape identical to that of the cavity 22 is fitted into the cavity. The structural element 10 is then cured to form the final product. This invention provides a machine for forming the fillet 18 without the problematic voids or damage that resulted from past methods of forming the fillet.

Figure 3:
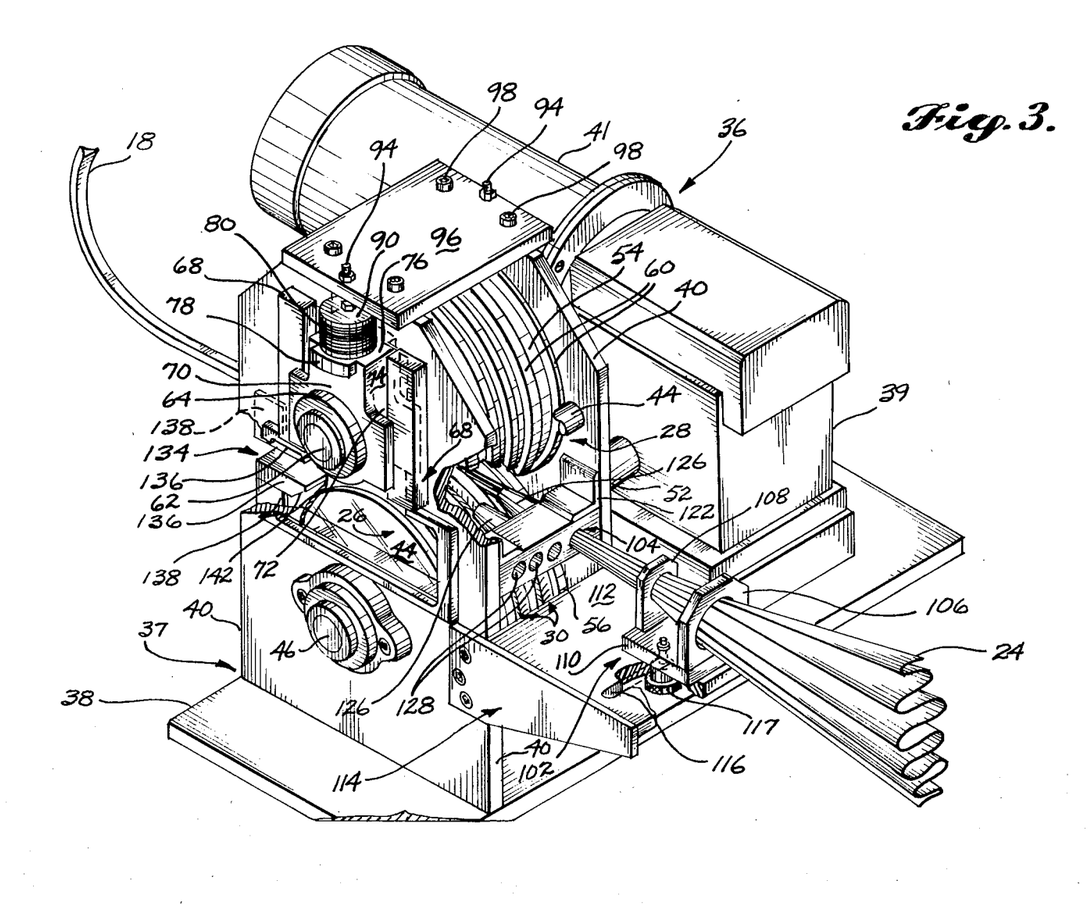
FIG. 3 is an isometric view of the machine formed in accordance with this invention.
Figure 4:
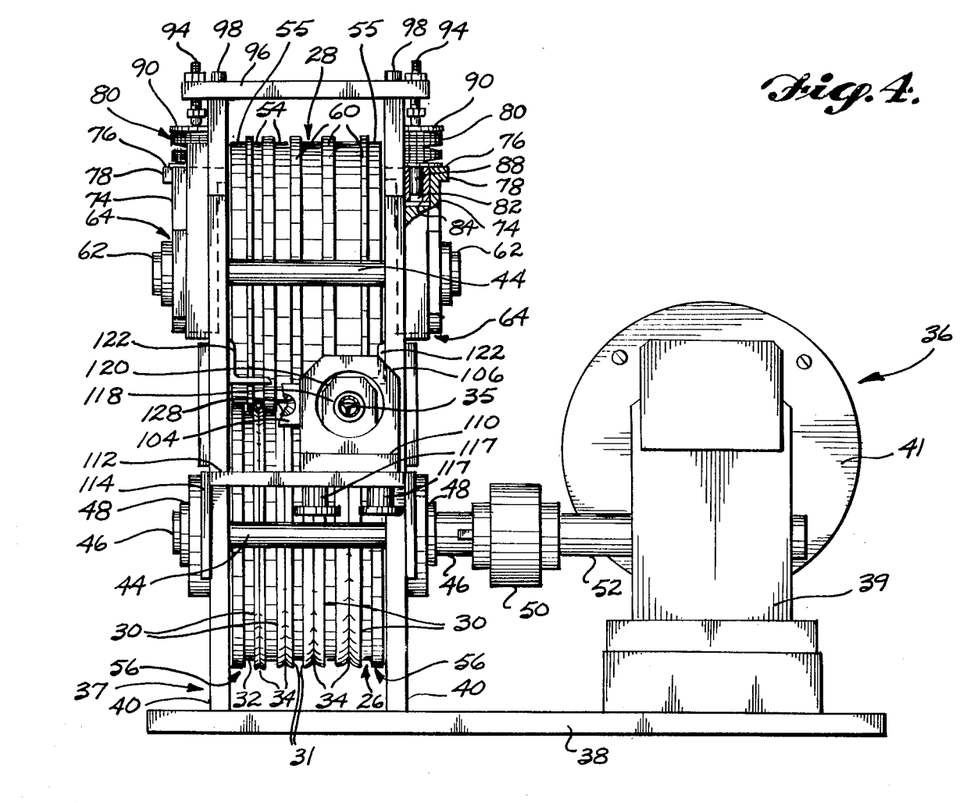
FIG. 4 is a front elevational view of the machine illustrated in FIG. 3.

Generally, as shown in FIGS. 3 and 4, a machine formed in accordance with the invention draws a thin strip of prepreg tape 24 (not shown in FIG. 4) from a supply source, also not shown. The tape is fed between a lower forming roll 26 and an upper forming roll 28. The rolls are mounted so that the upper forming roll 28 is urged into engagement with the lower forming roll 26. Dies are formed in annular protrusions 30 formed in the peripheral surface 32 of the lower forming roll. Each die comprises a groove 34 formed in its respective annular protrusion 30. The dies and the adjacent portions of the surface of the upper forming roll define orifices 35 where the two rolls meet. The orifices 35 have cross-sectional shapes identical to the shape of the above-described cavity 22. The prepreg tape 24 is directed by guides into one of the selected orifices 35. A drive motor assembly 36 rotates the lower forming roll 26 and frictional contact between the forming rolls results in the rotation of the lower forming roll rotating the upper forming roll 28. As the rolls rotate, friction between the sides of the orifice and the prepreg tape 24 draws the tape from the supply source. The prepreg tape 24 is compacted within the orifice 35 as it passes between the upper and lower forming rolls. The compacted prepreg tape 24 leaves the machine as a fillet 18 that is ready to be incorporated into the cavity 22 of the T-shaped structural element 10.

The details of the machine illustrated in FIGS. 3 and 4 are next presented. The illustrated machine includes a frame 37 comprising a base plate 38 which anchors the main components of the machine, and two side plates 40 fastened to the base plate. The side plates 40 are spaced apart and extend orthogonally upwardly from the base plate 38. Cylindrical spacer bars 44 are fastened at spaced-apart locations between the side plates 40 near the edges thereof. The spacer bars 44 maintain constant spacing between the side plates 40 and stabilize the overall structure of the machine.

The lower forming roll 26 is rotatably mounted between the lower portions of the side plates 40 and includes drive shaft elements 46 that extend outwardly from either end. The drive shaft elements 46 lie along the rotational axis of the lower forming roll and are mounted in bearings 48 that, in turn, are mounted in the side plates 40. One drive shaft element 46 extends beyond its associated side plate 40 and is coupled by a coupling 50 to the shaft 52 of an electric drive motor assembly 36. The electric drive motor assembly is also mounted on the base 38. The drive motor assembly 36 includes a direct current motor 41 and a right-angle gear box 39 which connects the motor 41 to the coupling 50.

While four annular protrusions 30 and, thus, four dies are shown in the illustrated embodiment of the invention, it is to be understood that the invention is not limited to four dies and that fewer or more can be included in other embodiments. The protrusions 30 in which the dies are formed are spaced apart along the length of the lower forming roll 26. Each protrusion 30 has flat, spaced-apart sidewalls 31. The grooves 34 that form the dies are V-shaped. The sides of the grooves 34 are curved to conform to the required shape of the two curved sides of the fillet 18. The dimensions of the grooves 34 vary from one protrusion to another. The variable sized grooves make it possible for various sized fillets 18 to be formed as needed, depending upon which die is used.

The upper forming roll 28 is rotatably mounted between the side plates 40, just above the lower forming roll 26. As more fully described below, the upper forming roll 28 is mounted in a manner that urges it into contact with the lower forming roll 26.

Figure 5:
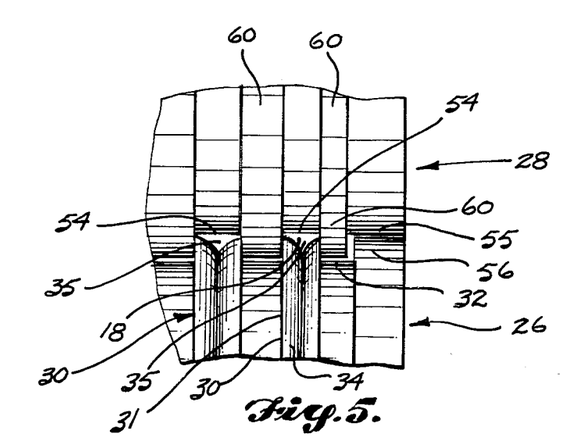
FIG. 5 is an enlarged, partial view of the interface between two forming rolls that form a part of the machine illustrated in FIG. 3.

A plurality of guard rims 60 extend radially outwardly from the outer surface of the upper forming roll 28. The guard rims 60 are rectangular in cross section. The illustrated embodiment of the invention includes five guard rims. The guard rims 60 are positioned such that a protrusion 30 fits snugly into the space between two adjacent guard rims where the lower and upper forming rolls 26 and 28 mesh with one another. The flat portions 54 of the outer surface of upper forming roll 28 lying between a pair of guard rims 60 and each aligned groove 34 combine to define an orifice 35. The cross-sectional shape of the orifices are identical to that of the desired fillet 18.

The guard rims 60 serve two purposes. First, they prevent the prepreg tape 24 from slipping laterally out of the orifices 35 as the prepreg tape passes through the machine. Second, the snug fit between the guard rims 60 and the sidewalls 31 of the annular protrusions 30 forms frictional contact between the upper and lower forming rolls that transfers the drive force from the lower forming roll to the upper forming roll 28 thereby imparting rotational motion to the upper forming roll 28 when the lower forming roll 26 is driven by the drive motor assembly 36.

In order to prevent the wearing of the annular protrusions 30 in which the dies are formed, the lower and upper forming rolls are formed such that the die surface of the protrusions 30 are prevented from bearing on the flat portions 54 of the upper forming roll 28 lying between the guard rims 60. Such bearing contact is prevented by annular ridges 56 that extend around the circumference of the lower forming roll 26 immediately proximal to the side plates 40. Each annular ridge 56 protrudes radially outwardly slightly further than the annular die protrusions 30. Each annular ridge 56 contacts an aligned portion 55 of the outer surface of the upper forming roll 28 that lies outside of the outermost guard rim 60. The aligned portions 55 are coplanar with the flat portions 54 of the upper forming roll 28 that lie between the guard rims 60. Because the ridges 56 project radially slightly further than the annular die protrusions 30, the ridges 56 prevent the flat portions 54 of the upper forming roll 28 lying between the guard rims 60 from bearing directly upon the annular die protrusions 30. Thus, wear and/or distortion of the die grooves 34 is prevented.

As previously mentioned, the upper forming roll 28 is rotatably mounted in the side plates 40 in a manner that continually urges the upper forming roll 28 into contact with the lower forming roll 26. To this end, the upper forming roll includes an axle 62. Each end of the axle is rotatably mounted in a movable bearing assembly 64. The bearing assembly 64 illustrated in the preferred embodiment is a standard duty take-up unit manufactured under the name SEALMASTER by Morse Industrial Corporation of Ithica, New York. The bearing assemblies 64 are slidably mounted on the outer surfaces of the side plate 40. More specifically, elongate, flat, rectangular bearing guides 68 are fixed to the outer surface of each side plate 40 along the vertical edges of a rectangular-shaped opening in the side plates. Each bearing assembly 64 includes a slider unit 70 having two substantially rectangular slide channels 72 located along opposite edges of the slider unit. The slide channels 72 are sized and positioned to straddle and slide along the bearing guides 68. Thus, the entire bearing assembly 64 is vertically slidable along the bearing guides.

Each slider unit 70 also includes an integrally formed boss 74 that extends upwardly from the center of the slider unit 70. The boss 74 has a flanged upper end 78 that includes a flat upper surface 76. An aperture 82 (FIG. 4) is formed partially into each boss 74 through its upper surface 76. The longitudinal centerline of the aperture 82 orthogonally intersects the longitudinal centerline of axle 62 of the upper forming roll 28. A flanged bushing 84 fits within the aperture 82, its flange resting on the upper surface 76 of the boss 74. A plurality of spring washers 80 rest on the upper surface 76 of the boss 74 and their centers aligned with aperture 82. The spring washers 80 are conventional bowl-shaped resilient washers which resist compression with an intrinsic spring force. A center pin 88 having an integrally formed flange 90 fixed to one end extends downwardly through the center of the spring washers 80 and fits into the bore of flanged bushing 84. The flange 90 of center pin 88 rests upon the top of spring washers 80.

Two adjustable screws 94, one aligned with each center pin 88, are threaded through a top plate 96 that spans across the top of the machine between the tops of the side plates 40. The top plate 96 is secured to the side plates 40 by screws 98. The adjustable screws 94 impinge upon the underlying flanges 90 of the center pins 88 and compress the spring washers 80. The compressed spring washers 80 provide the force that continuously urges the slidable bearing assemblies 64 (and, hence, the upper forming roll 28) toward the lower forming roll 26.

Prepreg tape 24 is directed into the orifices 35 that compact the tape into fillets 18 by a movable guide assembly 102 and a fixed guide nozzle assembly 104. As shown in FIGS. 3 and 4, the movable guide assembly 102 consists of a first guide element 106, a second guide element 108 and a flat, rectangular guide base 110. The first and second guide elements 106 and 108, respectively, are parallel plates, spaced apart from each other and mounted at the opposing ends of the base 110. The guide base rests upon a horizontal platform 112 that is part of a cantilevered support bracket 114. The cantilevered support bracket 114 is mounted between the outer edges of the side plates 40 and projects outwardly from the front of the machine, toward the source of the prepreg tape 24. An elongate slot 116 is formed in the horizontal platform 112 of the cantilevered support bracket 114. The slot 116 extends substantially across the width of the horizontal platform, parallel to the rotational axes of the lower forming roll 26 and the upper forming roll 28.

The shanks of two knurled shoulder screws 117 extend from beneath the horizontal platform 112, through the slot 116 into threaded holes in the guide base 110. When tightened the shoulder screws 117 secure the guide base 110 (and, hence, the first and second guide elements 106 and 108) to the cantilevered support bracket 114. Loosening the shoulder screws 117 allows the movable guide assembly 102 to be shuttled along the length of slot 116.

Figure 6:
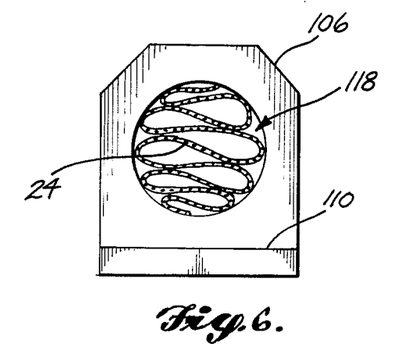
FIG. 6 is a front view of a first guide element that forms part of the machine illustrated in FIG. 3.
Figure 7:
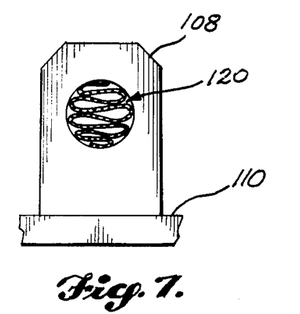
FIG. 7 is a front view of a second guide element that also forms part of the machine illustrated in FIG. 3.

Each of the first and second guide elements 106 and 108 include a guide hole 118 and 120. The centerlines of guide holes 118 and 120 are collinear. The holes are located so that movement of the guide assembly 102 along the slot 116 allows the centerline of the guide holes to be aligned with any selected orifice 35.

With reference to FIGS. 6 and 7, the guide hole 118 in the first guide element 106, which is closer to the source of the prepreg tape 24 than the second guide element, has a larger diameter than the guide hole 120 in the second guide element 108. This graduated feature of the guide holes causes the gradual alteration of the shape of the prepreg tape 24 from a substantially flat cross section to a substantially circular cross section that becomes progressively smaller as the tape is drawn toward the orifices 35.

The fixed guide nozzle assembly 104 is located between the movable guide assembly 102 and the orifices 35 formed by the upper and lower forming rolls in the manner heretofore described. The guide nozzle assembly 104 is secured to the side plates 40 of the machine by angle brackets 122.

Figure 8:
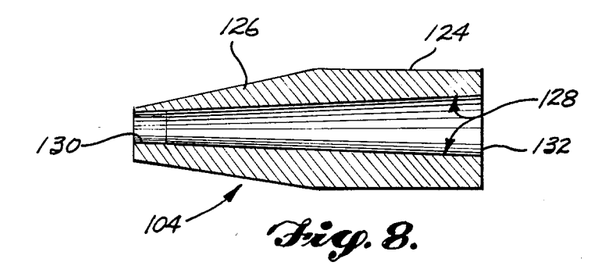
FIG. 8 is a longitudinal cross-sectional view of a nozzle, which also forms part of the machine illustrated in FIG. 3.

As shown in FIGS. 3, 4 and 8, the guide nozzle assembly 104 consists of a substantially rectangular bar 124 having four integrally formed nozzles 126 protruding from one side. Each nozzle is aligned with a corresponding orifice 35. Each nozzle 126 includes a bore 128 having an inner end 130 and an outer end 132. The bores 128 have a circular cross-section configuration and are tapered with the outer end 132 being slightly larger in diameter than the inner end 130. Further, the inner end, which is nearest the orifice 35, is sized to have an area roughly the same as that of the orifice.

As shown in FIGS. 3 and 4, the bores 128 of the guide nozzle assembly 104 are oriented so that when the movable guide assembly 102 is positioned in front of a selected orifice 35, the centerlines of guide holes 118 and 120 are coaxial with the centerline of the bore that corresponds to the selected orifice. The prepreg tape 24, after passing through the guide holes 118 and 120 of the movable guide assembly 102, travels through the aligned bore, which reduces the diameter of the tape to that of the inner end 130 of the bore. The prepreg tape 24 then enters the orifice 35 where it is formed in the manner described above.

As shown in FIG. 3, a separator 134 is fixed to the back of the machine and controls the direction of the prepreg tape 24 as it leaves the machine in the form of a fillet 18. The separator comprises a pair of spaced-apart plates 136 attached by angle brackets 138 to the side plates 40. The innermost edges of the plates 136 are beveled and the plates 136 are positioned such that the beveled edges are located very near the exit ends of the orifices 35. The close spacing results in the separator plates 136 functioning to strip the fillet away from the forming rolls as it exits the forming orifice. Because the plates 136 extend rearwardly from the orifices they also act as a safety device by making it difficult for a person to touch the moving forming rolls where they mesh.

Finally, preferably, a window 144 is formed in each side plate 40 to allow viewing of the compacting action of the machine.

OPERATION

The operation of the embodiment of the invention illustrated in FIGS. 3 and 4 is next described. First, the machine is set up for producing a fillet 18 of a particular size. To do this, the knurled shoulder screws 117 are loosened and the guide assembly 102 is moved along the horizontal platform 112 of the cantilevered support bracket 114 until the centerline of the guide holes 118 and 120 of the first and second guide elements 106 and 108, respectively, are aligned with the appropriate bore 128 in the guide nozzle assembly 104 that corresponds to the orifice 35 that has the cross-sectional shape of the desired fillet. Secondly, a strip of prepreg tape 24 is drawn from its supply source and threaded through the guide holes 118 and 120. The tape is then threaded through the appropriate bore 128 of the guide nozzle assembly 104; and, then, into the selected orifice 35. Thirdly, drive motor assembly 36 is actuated causing rotation of the lower forming roll 26 (counterclockwise rotation as viewed in FIG. 3). The frictional contact between the lower and upper forming rolls causes corresponding (clockwise) rotation of the upper forming roll 28. As a result of friction between the prepreg tape and orifice walls, prepreg tape 24 is drawn from its supply source by the rotating forming rolls. The prepreg tape 24 is compacted in the orifice 35 into the shape of the fillet 28. The fillet 18 then leaves the machine through the separator 134 and is ready to be cut into lengths appropriate for use in a structural element, such as element 10 illustrated in FIG. 1 and earlier described.

While the present invention has been described in relation to a preferred embodiment, it is to be understood that various alterations, substitutions of equivalents and other changes can be made without departing from the spirit and scope of the invention.

The embodiments of the invention in which an exclusive property or privilege is claimed are defined as follows:

1. A machine for drawing a strip of composite material from a supply source and forming it into a fillet, comprising:
   (a) a frame;
   (b) a first forming roll rotatably mounted in said frame, said first forming roll containing a plurality of spaced-apart dies formed by grooves located in the peripheral surface of said forming roll;

(c) a second forming roll rotatably mounted in said frame adjacent to said first forming roll such that the peripheral surface of said second forming roll impinges on and frictionally engages the peripheral surface of said first forming roll, the peripheral surface of said second forming roll impinging on the peripheral surface of said first forming roll such that said grooves forming said plurality of spaced-apart dies and said surface of said second forming roll define a series of fully closed orifices, each orifice having a fillet crosssectional shape; and, (d) drive means for rotating one of said first and second forming rolls, the frictional engagement between said forming rolls resulting in a corresponding rotation of the other of said first and second forming rolls, the rotation of said first and second forming rolls causing a strip of composite material introduced into a selected one of said orifices to be drawn from its supply source and compacted into a fillet shape.

2. The machine of claim 1, wherein:
(a) the peripheral surface of said first forming roll includes a plurality of spaced-apart annular protrusions, each of said protrusions including one of said grooves and, thus, forming one of said spaced-apart dies; and,
(b) the peripheral surface of said second forming roll includes a plurality of annular guard rims positioned so as to frictionally engage said plurality of annular protrusions of said first forming roll.

3. The machine of claim 2, wherein:
(a) each of said spaced-apart annular protrusions of said first forming roll includes a pair of outer sidewalls;
(b) the annular guard rims of said second forming roll have sidewalls and are aligned with the spaces between said spaced-apart annular protrusions of said first forming roll; and,
(c) the sidewalls of said annular protrusions of said first forming roll frictionally engage the sidewalls of the annular guard rims of said second forming roll.

4. The machine of claim 3, further including guide means mounted to the machine for directing said strip of composite material into said selected one of said orifices.

5. The machine of claim 4, wherein said guide means includes a guide nozzle assembly mounted to the frame, said guide nozzle assembly having a plurality of bores extending therethrough, the longitudinal centerline of each bore being aligned with a corresponding orifice, said strip of composite material passing through the bore aligned with said selected one of said orifices, said bores being tapered so that the end of each bore nearest its related orifice is smaller than the end of the bore furthest from its related orifice.

6. The machine of claim 5, wherein said guide means further includes a movable guide assembly mounted to said machine upstream of said guide nozzle assembly, said movable guide means being selectively alignable with the bores of said guide nozzle assembly for directing said strip of composite material into the bore of the guide nozzle assembly aligned with said selected one of said orifices.

7. The machine of claim 6, wherein said movable guide assembly includes at least two spaced-apart guide elements, said guide elements having concentrically aligned holes, the centerline of said concentrically aligned holes being alignable with the longitudinal centerline of a selected one of the bores of said guide nozzle assembly, the size of the hole in said guide elements nearest to said guide nozzle assembly being smaller than the hole in said guide element furthest away from said guide nozzle assembly.

8. The machine of claim 7, wherein:
at least two annular ridges are formed in and project from the peripheral surface of said first forming roll, said annular ridges projecting outwardly slightly further than said annular protrusions; and,
the peripheral surface of said second forming roll is in bearing contact with said annular ridges, said bearing contact preventing said annular protrusions from impinging on the portion of said peripheral surface of said second forming roll that is aligned with said annular protrusions.

9. The machine of claim 8, further including spring means connected to one of said forming rolls for urging said one of said forming rolls into continuous contact with the other of said forming rolls.

10. The machine of claim 9, wherein each said groove is formed by two convex surfaces, the convex surfaces being configured and arranged to define a groove having a V-shape.

11. The machine of claim 1, further including guide means mounted to the machine for directing said strip of composite material into said selected one of said orifices.

12. The machine of claim 11, wherein said guide means includes a guide nozzle assembly mounted to the frame, said guide nozzle assembly having a plurality of bores extending therethrough, the longitudinal centerline of each bore being aligned with a corresponding orifice, said strip of composite material passing through the bore aligned with said selected one of said orifices, said bores being tapered so that the end of each bore nearest its related orifice is smaller than the end of the bore furthest from its related orifice.

13. The machine of claim 12, wherein said guide means further includes a movable guide assembly mounted to said machine upstream of said guide nozzle assembly, said movable guide means being selectively alignable with the bores of said guide nozzle assembly for directing said strip of composite material into the bore of the guide nozzle assembly aligned with said selected one of said orifices.

14. The machine of claim 13, wherein said movable guide assembly includes at least two spaced-apart guide elements, said guide elements having concentrically aligned holes, the centerline of said concentrically aligned holes being alignable with the longitudinal centerline of a selected one of the bores of said guide nozzle assembly, the size of the hole in said guide elements nearest to said guide nozzle assembly being smaller than the hole in said guide element furthest away from said guide nozzle assembly.

15. A machine for drawing a strip of composite material from a supply source and forming it into a fillet, comprising:
(a) a frame;
(b) a first forming roll rotatably mounted in said frame, the peripheral surface of said first forming roll including at least one spaced-apart annular protrusion, said protrusion including a peripheral groove formed therein, said groove defining a die;
(c) a second forming roll rotatably mounted in said frame adjacent to said first forming roll, the peripheral surface of said second forming roll including at least two annular guard rims positioned so as to frictionally engage said annular protrusion of said first forming roll on each side of said groove, said groove defining said die and an associated portion of said peripheral surface of said second forming roll defining a fully closed orifice, said orifice having a fillet cross-sectional shape; and (d) drive means for rotating one of said first and second forming rolls, the frictional engagement between said forming rolls resulting in a corresponding rotation of the other of said first and second forming rolls, the rotation of said first and second forming rolls causing a strip of composite material that is introduced into said orifice to be drawn from its supply source and compacted into a fillet shape.

* * * * *